United States Patent
Byun et al.

(10) Patent No.: US 9,992,686 B2
(45) Date of Patent: Jun. 5, 2018

(54) METHOD AND DEVICE FOR PERFORMING CELL SHAPING

(71) Applicant: LG Electronics Inc., Seoul (KR)

(72) Inventors: Daewook Byun, Seoul (KR); Jian Xu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/517,650

(22) PCT Filed: Nov. 3, 2015

(86) PCT No.: PCT/KR2015/011676
§ 371 (c)(1),
(2) Date: Apr. 7, 2017

(87) PCT Pub. No.: WO2016/072686
PCT Pub. Date: May 12, 2016

(65) Prior Publication Data
US 2017/0311176 A1    Oct. 26, 2017

Related U.S. Application Data

(60) Provisional application No. 62/074,555, filed on Nov. 3, 2014.

(51) Int. Cl.
| | | |
|---|---|---|
| *H04W 40/00* | (2009.01) | |
| *H04W 16/24* | (2009.01) | |
| *H04W 28/10* | (2009.01) | |

(52) U.S. Cl.
CPC .......... *H04W 16/24* (2013.01); *H04W 28/10* (2013.01)

(58) Field of Classification Search
CPC ..... H04W 16/24; H04W 28/10; H04W 36/16; H04W 16/08; H04W 16/18
(Continued)

(56) References Cited

U.S. PATENT DOCUMENTS

| 7,107,012 | B2 * | 9/2006 | Kashiwagi | ............... H04B 7/04 342/350 |
| 7,606,531 | B2 * | 10/2009 | Asai | ..................... H04B 7/1555 342/352 |

(Continued)

FOREIGN PATENT DOCUMENTS

| KR | 2010-0122267 A | 11/2010 |
| KR | 2013-0133278 A | 12/2013 |
| WO | 2014/163553 A1 | 10/2014 |

OTHER PUBLICATIONS

Kyocera Corp, "Cell coverage configuration transition for ES LTE coverage scenario", R3-140295, 3GPP TSG RAN WG3 Meeting #83, Prague, Czech Republic, Feb. 1, 2014.

*Primary Examiner* — Marceau Milord
(74) *Attorney, Agent, or Firm* — Dentons US LLP

(57) ABSTRACT

The present invention relates to a method and a device for performing cell shaping. A base station can establish a cell shaping plan on the basis of current states. The current states may be the load of the base station and the traffic space distribution of the base station. The base station transmits a first message to a neighboring base station and receives a second message from the neighboring base station in response to the first message. The first message may include the cell shaping plan, and the second message may include whether or not the neighboring base station can perform cell shaping. The base station can determine whether or not to perform cell shaping on the basis of the second message.

13 Claims, 21 Drawing Sheets

(58) Field of Classification Search
USPC ............... 455/446, 436, 437, 442, 509, 454
See application file for complete search history.

(56) References Cited

U.S. PATENT DOCUMENTS

| | | | | |
|---|---|---|---|---|
| 8,279,837 B2* | 10/2012 | Qiu | ................... | H04W 36/0055 370/331 |
| 8,406,781 B2* | 3/2013 | Vujcic | ................. | H04W 72/048 370/329 |
| 8,477,657 B2* | 7/2013 | Wang | ................ | H04W 36/0083 370/252 |
| 8,548,457 B2* | 10/2013 | O'Keeffe | ........... | H04N 7/17309 455/422.1 |
| 8,606,288 B2* | 12/2013 | Dimou | ................ | H04W 36/24 370/331 |
| 8,953,447 B2* | 2/2015 | Kang | ................ | H04W 28/0284 370/232 |
| 8,964,781 B2* | 2/2015 | Hunzinger | ............. | H04B 7/155 370/236 |
| 8,996,018 B2* | 3/2015 | Tzavidas | ............... | H04W 16/14 370/329 |
| 9,681,448 B2* | 6/2017 | Centonza | .......... | H04W 72/0473 |
| 9,756,537 B2* | 9/2017 | Park | ...................... | H04W 36/16 |
| 2004/0242276 A1 | 12/2004 | Kashiwagi et al. | | |
| 2008/0057933 A1* | 3/2008 | Brunner | ................ | H04W 16/06 455/422.1 |
| 2010/0202343 A1* | 8/2010 | Hunzinger | ............. | H04B 7/155 370/315 |
| 2010/0278038 A1* | 11/2010 | Stahle | ................... | H04W 24/04 370/216 |
| 2012/0252458 A1* | 10/2012 | Ohnishi | ................ | H04L 43/062 455/436 |
| 2012/0276901 A1* | 11/2012 | Kruglick | ........... | H04W 36/0083 455/436 |
| 2013/0035101 A1* | 2/2013 | Wang | ................ | H04W 36/08 455/437 |
| 2013/0176874 A1* | 7/2013 | Xu | ...................... | H04W 52/242 370/252 |
| 2014/0056275 A1* | 2/2014 | Behnamfar | ......... | H04W 72/085 370/330 |
| 2015/0139368 A1* | 5/2015 | Abrishamkar | ..... | H04B 1/71072 375/346 |
| 2016/0044518 A1* | 2/2016 | Centonza | ............. | H04W 24/02 370/328 |
| 2016/0205596 A1* | 7/2016 | Yao | .................. | H04W 36/0083 370/329 |

* cited by examiner

FIG. 2
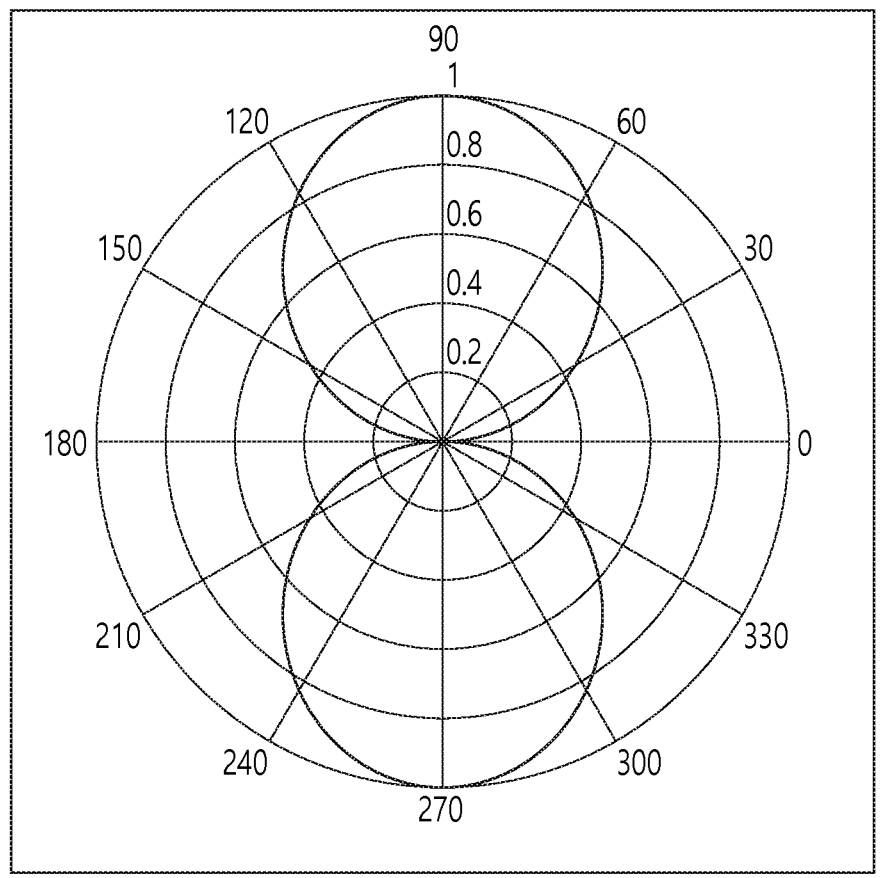
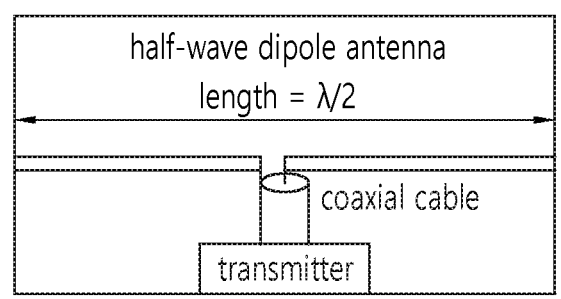

FIG. 3
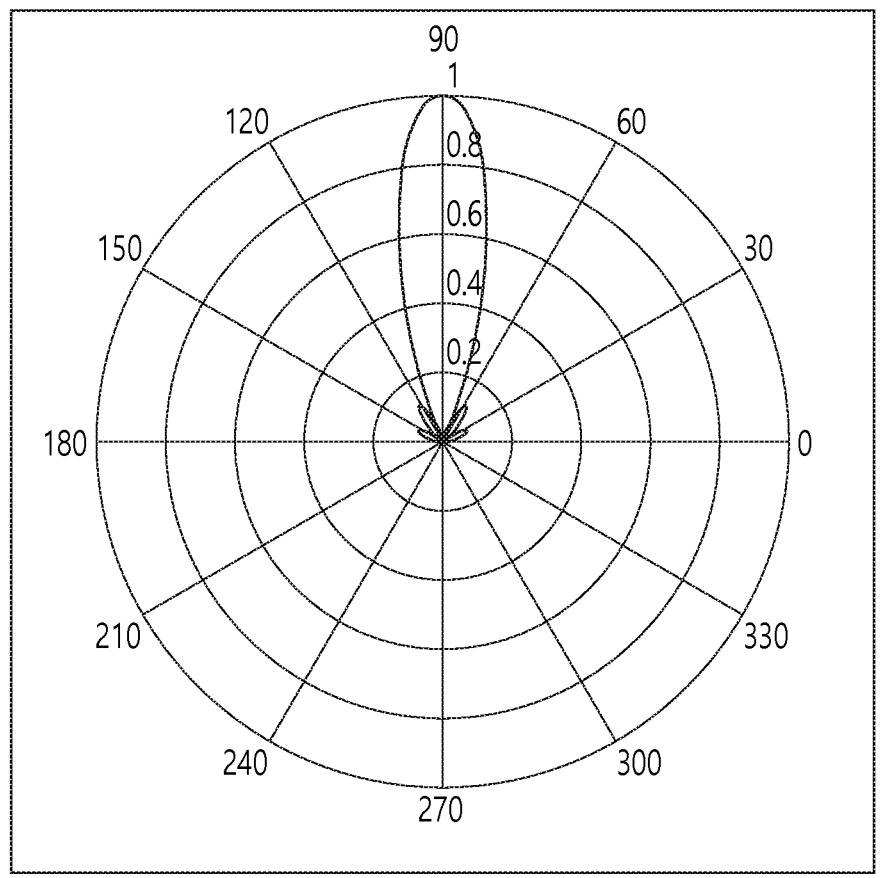
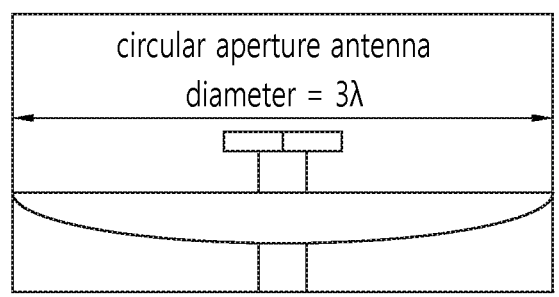

FIG. 4
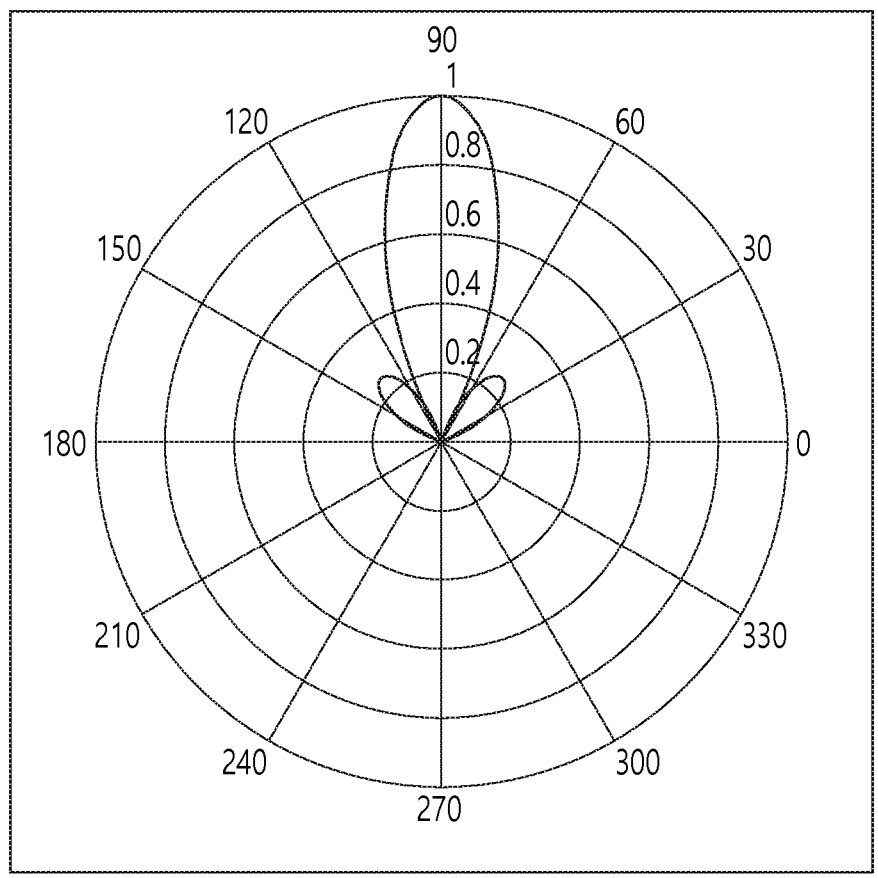
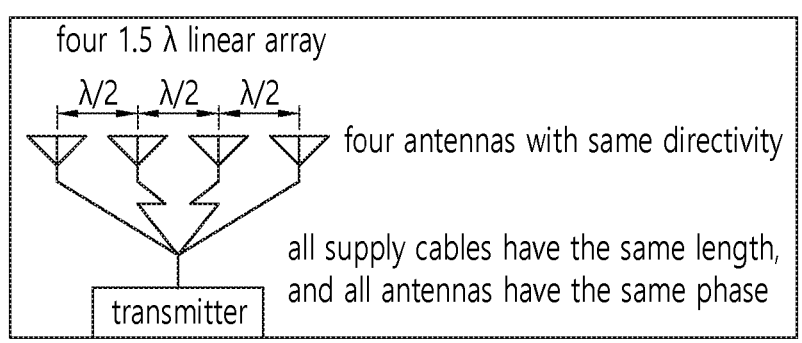

METHOD AND DEVICE FOR PERFORMING CELL SHAPING

CROSS-REFERENCE TO RELATED APPLICATIONS

This application is the National Stage filing under 35 U.S.C. 371 of International Application No. PCT/KR2015/011676, filed on Nov. 3, 2015, which claims the benefit of U.S. Provisional Application No. 62/074,555 filed on Nov. 3, 2014, the contents of which are all hereby incorporated by reference herein in their entirety.

BACKGROUND OF THE INVENTION

Field of the Invention

The present invention relates to wireless communication, and more particularly to a method and a device for a base station to perform cell shaping in cooperation with a neighboring base station in a wireless communication system.

Related Art

With the development of wireless communication systems and the wide use of smart devices in recent years, demands for wireless data are steadily increasing, and this trend is expected to continue. One of crucial issues in a wireless communication system is the efficient use of frequencies.

Beamforming is an antenna technique for concentrating energy radiated from an antenna in a specific direction in a space. Beamforming is intended to receive a signal with higher strength from a desired direction or to transmit a signal with intensive energy in a desired direction. In particular, a beamforming system is required to achieve various forms of high-gain beams for high speed and high capacity of a wireless communication system. For example, a beamforming system may be used for high-speed transmission/reception communications of high-capacity data for multiple users and communications in a high pass loss band, such as diverse satellite aeronautical communications using a smart antenna including a satellite antenna and an aeronautical antenna. Therefore, studies are being conducted on beamforming communications for a variety of fields, such as next-generation mobile communications, various kinds of radar, military and aerospace communications, indoor and inter-building high-speed data communications, a wireless local area network (WLAN), a wireless personal area network (WPAN), and the like.

Furthermore, as the development of an active antenna system (AAS) enables relatively free beamforming in recent years, an attempt to apply vertical sectorization is being made. Unlike the existing stationary antenna system, the AAS is a system in which an actuator is installed to remotely control an antenna in position and direction, which is capable of dynamically changing antenna settings according to a cell characteristic or user service demand. This technique enables more efficient use of frequencies to increase frequency efficiency by about 50% as compared with the existing technology. Thus, AAS functions may be effectively used generally for scenarios, such as congestion with a large number of UEs, a high traffic demand, and a temporary or steady concentration of UEs on a specific area.

A self-organizing network (SON) is an automation technology in installation and management of a base station for efficient and reliable network management and includes self-configuration, self-optimization, and self-healing functions.

SUMMARY OF THE INVENTION

The present invention proposes a method and a device for performing cell shaping. An evolved node-B (eNB) may receive information on the possibility of performing cell shaping from a neighboring eNB and may determine whether to perform cell shaping. The eNB may receive the spatial distribution of traffic from the neighboring eNB and may determine whether to perform cell shaping. The information on the possibility of performing cell shaping and the spatial distribution of traffic may be received through an X2 connection between the eNB and the neighboring eNB.

According to one embodiment, there is provided a method for performing cell shaping by an eNB in a wireless communication system. The method may include: establishing a cell shaping plan based on a current state of the eNB; transmitting a first message to a neighboring eNB; receiving a second message from the neighboring eNB in response to the first message; and determining whether to perform cell shaping based on the second message.

The current state of the eNB may include loads of the eNB and a spatial traffic distribution of the eNB. The eNB and the neighboring eNB may be connected via X2.

The first message may include the cell shaping plan, and the second message may include information on whether the neighboring eNB is capable of performing cell shaping. The first message may be one of a cell shaping indication message, an existing message, a new information element (IE) included in an existing message, and a new IE included in a new message, and the second message may be one of an indication message, an existing message, a new IE included in an existing message, and a new IE included in a new message. When it is possible to perform cell shaping based on the second message, the eNB may indicate cell shaping to the neighboring eNB and may perform cell shaping; and when it is impossible to perform cell shaping based on the second message, the eNB may not perform cell shaping.

The first message may include any one in a parameter set predefined for cell shaping, and the second message may include information on applicability of the one in the predefined parameter set included in the first message and on applicability of other parameters than the one in the predefined parameter set. When it is possible to apply the one in the predefined parameter set based on the second message, the eNB may indicate cell shaping to the neighboring eNB and may perform cell shaping by applying the one in the predefined parameter set; and when it is impossible to apply the one in the predefined parameter set based on the second message, the eNB may not perform cell shaping or may identify whether it is possible to perform a different type of cell shaping by applying an applicable type in the predefined parameter set.

The first message may include a request to report a spatial traffic distribution of the neighboring eNB, and the second message may include the spatial traffic distribution of the neighboring eNB. When it is possible to perform cell shaping based on the second message, the eNB may indicate cell shaping to the neighboring eNB and may perform cell shaping; and when it is impossible to perform cell shaping based on the second message, the eNB may not perform cell shaping. The first message may be one of an invoke indication message, an existing message, a new IE included in an existing message, and a new IE included in a new message, and the second message may be a load information message.

According to another embodiment, there is provided an eNB for performing cell shaping. The eNB includes: a memory; a transceiver; and a processor to connect the memory and the transceiver, wherein the processor may be configured to: establish a cell shaping plan based on a current state of the eNB; control the transceiver to transmit a first message to a neighboring eNB; control the transceiver to receive a second message from the neighboring eNB in response to the first message; and determine whether to perform cell shaping based on the second message.

The first message may include the cell shaping plan, and the second message may include information on whether the neighboring eNB is capable of performing cell shaping.

The first message may include a request to report a spatial traffic distribution of the neighboring eNB, and the second message may include the spatial traffic distribution of the neighboring eNB. When it is possible to perform cell shaping based on the second message, the eNB may indicate cell shaping to the neighboring eNB and may perform cell shaping; and when it is impossible to perform cell shaping based on the second message, the eNB may not perform cell shaping.

An eNB may efficiently perform cell shaping in cooperation with a neighboring eNB.

BRIEF DESCRIPTION OF THE DRAWINGS

FIG. 2 illustrates a radiation pattern of a half-wave dipole antenna.

FIG. 3 illustrates a radiation pattern of a circular aperture antenna such as a satellite receiving antenna.

FIG. 4 illustrates a radiation pattern of a linear array antenna.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
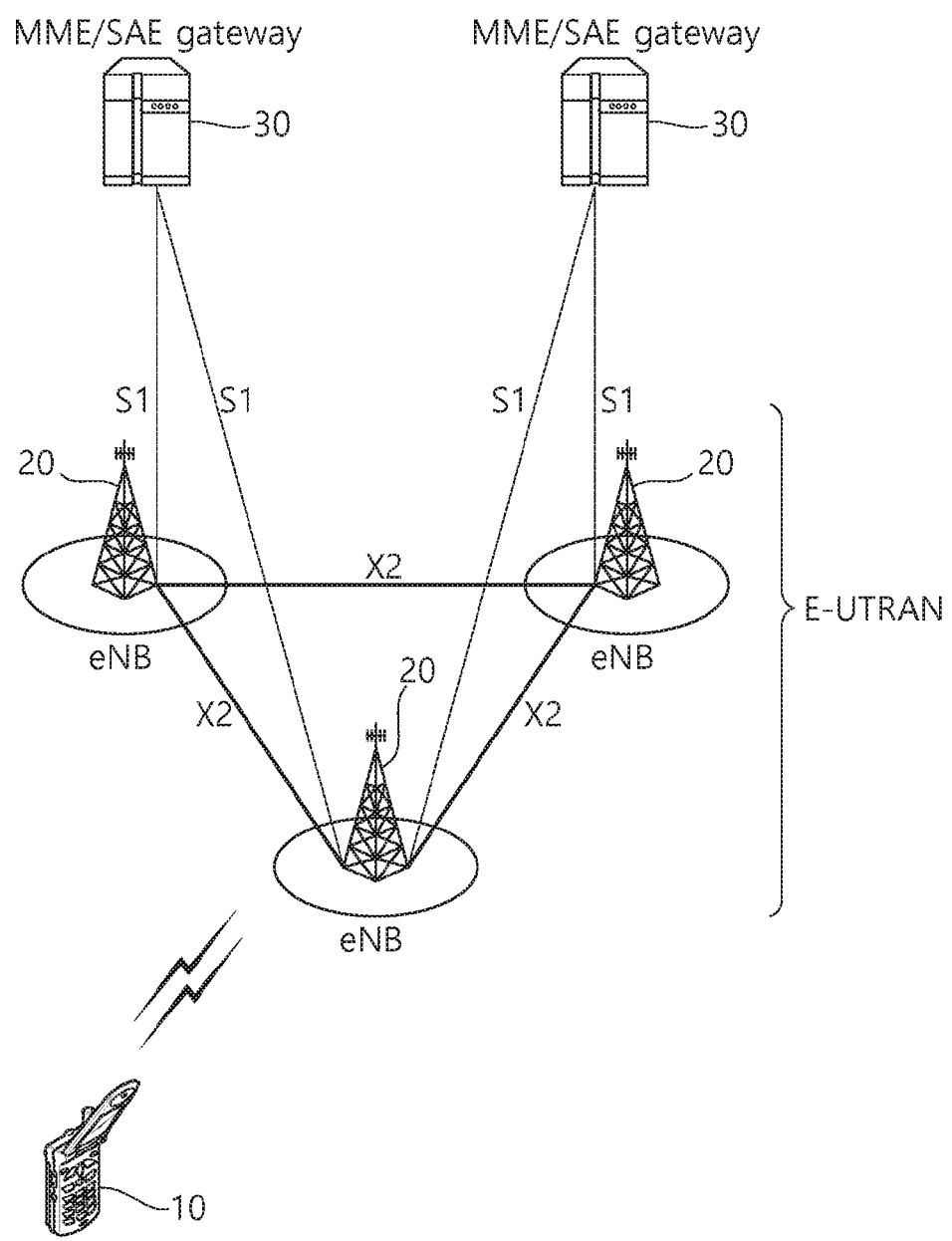
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE) 10, an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

An EPC includes a mobility management entity (MME) and a system architecture evolution (SAE) gateway (S-GW). One or more MMEs/S-GWs 30 may be disposed at the end of a network and may be connected with an external network. For clarity, an MME/S-GW 30 may be simply referred to as a gateway hereinafter, in which it would be understood that the gateway includes both an MME and an S-GW.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface.

FIG. 2 illustrates a radiation pattern of a half-wave dipole antenna.

A half-wave dipole antenna is a simple half-way antenna in which a wire is connected to a disconnected central portion for cable connection. A directional antenna is designed to have gain in only one direction and to have loss in other directions. As an antenna increases in size, directivity thereof is created. A wave radiated from an antenna travels a long distance with directivity and may be more easily controlled when given a directional radiation pattern which is constructive interference or unconstructive interference.

FIG. 3 illustrates a radiation pattern of a circular aperture antenna, such as a satellite receiving antenna.

To be extremely simplified, a satellite receiving antenna is considered to be a circular surface from which the same electromagnetic waves are radiated in all parts. Referring to FIG. 3, a beam with a narrow width having a high gain is disposed at the center of the radiation pattern. As the diameter of the antenna increases according to a wavelength, the width of the central beam becomes gradually narrow. Small beams called side lobes appear on both sides of the central beam. The direction of a signal with a signal strength of 0 may be expressed as "nulls." A simple directional antenna is constructed from a linear array of small radiating antenna elements, and the same signal with the same amplitude and the same phase is provided from one transmitting end to each antenna element. As the entire width of the array increases, the central beam becomes narrow; as the number of antenna elements increases, side robes become small.

FIG. 4 illustrates a radiation pattern of a linear array antenna.

FIG. 4 shows a radiation pattern of four small antenna elements disposed at an interval of λ/2. The radiation pattern of the linear array may be represented by a radiation pattern of a single antenna multiplied by an array factor (AF) representing impact of constructive interference and destructive interference of each antenna signal. That is, the array factor represents a change in maximum antenna gain according to a beam width.

Figure 5:
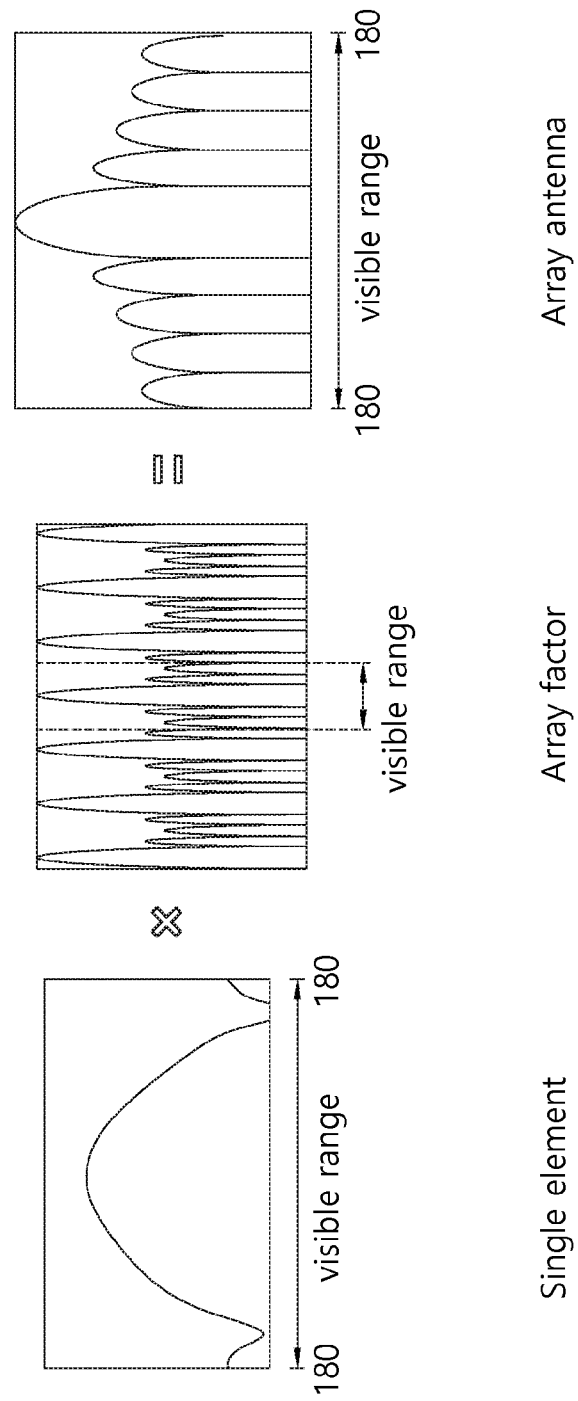
FIG. 5 illustrates a process of obtaining a radiation pattern of a linear array antenna.

FIG. 5 illustrates a process of obtaining a radiation pattern of a linear array antenna.

Referring to FIG. 5, an antenna gain may be obtained by multiplying a radiation pattern $E_r(\omega)$ of a single antenna (single element) by an array factor. An array factor may be changed based on the number of antennas forming an antenna array, the distance between antennas, and a weight by which each antenna is multiplied. The array factor may be represented by Equation 1.

$$AF(\theta) = \sum_{n=1}^{N_T} w_n e^{j(n-1)(kd\cos\theta + \phi)} \quad \text{[Equation 1]}$$

In Equation 1, $N_T$ denotes the number of antenns, $w_n$ denotes a weight for each antenna, d denotes the distance between antennas, $k=2\pi/\lambda$, denotes a wave number, θ denotes an angle from a directing point of an antenna array, and φ denotes a phase offset.

That is, when the heading direction (θ) of a beam from an antenna array is 0 and antennas are disposed at equal intervals, array factor values are expressed to be laterally symmetrical based on the heading direction. If a base station transmits a signal in a direction rotated through x degrees based on a boresight to which the antenna heads, an antenna gain at a directing point of a beam may be represented by $E_r(x)AF(0)$. Further, a beam gain at a point rotated through y degrees based on the directing point of the beam may be represented by $E_r(x+y)AF(y)$.

A window (vision region) of an AF may be shifted according to θ applied to the AF, and a final antenna gain is obtained by multiplying the window and a corresponding antenna radiation pattern.

Figure 6:
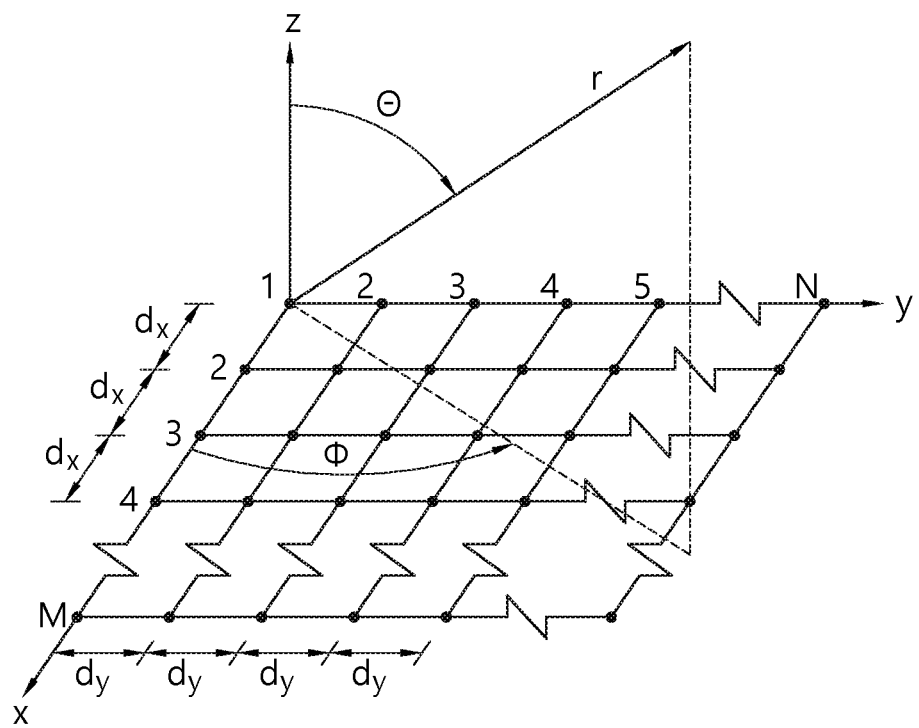
FIG. 6 illustrates an antenna array arranged in two dimensions.

FIG. 6 illustrates an antenna array arranged in two dimensions.

Referring to FIG. 6, antennas may be arranged at regular intervals in horizontal and vertical directions. θ denotes an azimuth angle, and φ denotes a vertical angle. dx and dy denote horizontal and vertical intervals between antenna elements. When antennas are arranged as in FIG. 6, AF may be represented by Equation 2.

$$AF(\theta,\varphi) = AF_H(\theta,\varphi)AF_V(\theta,\varphi) \quad \text{[Equation 2]}$$

In Equation 2, $AF_H$ and $AF_V$ may be represented by Equation 3 and Equation 4, respectively.

$$AF_H(\theta, \phi) = \sum_{n=1}^{N} w_{1n} e^{j(n-1)(kd_y \sin\theta \sin\phi + \beta_y)} \quad \text{[Equation 3]}$$

$$AF_V(\theta, \phi) = \sum_{m=1}^{M} w_{m1} e^{j(m-1)(kd_x \sin\theta \cos\phi + \beta_x)} \quad \text{[Equation 4]}$$

Similarly, a radiation pattern of a single antenna may also be represented using parameters θ and φ by $E_r(\theta,\varphi)$. Meanwhile, in a system, such as coordinated multipoint (CoMP) between base stations, base stations may exchange interference information and may perform user equipment (UE) scheduling based on the interference information.

Hereinafter, a self-organizing network (SON) is described.

An SON is one of important technologies for automatically initializing and managing small cells when a relatively larger number of small-cell base stations are disposed than a macro base station. The SON technology operates in divided processes: self-configuration that enables automatic configuration of configuration information on a base station at the initial installation and operation of the base station; self-optimization as an operation process for optimization of neighboring cell management and coverage parameter configuration; and self-healing for error detection and healing during an operation.

Self-configuration functions are functionalities in which parameters necessary for an initial operation of a base station are autonomously collected and analyzed at the installation of a new or additional base station to automate processes of identifying a neighboring base station, establishing/registering a relationship, and establishing a connection to a core network prior to an initial booting up process and operation of a base station.

Self-optimization functions include an inter-cell interference coordination (ICIC) function of minimizing interference between base stations using information on types of signals and traffic between neighboring base stations in operating a base station, a coverage and capacity optimization (CCO) function for coverage hole detection and for optimal capacity and coverage, a random access channel (RACH) optimization (RO) function for optimal use of an RACH, a mobile load balancing (MLB) function for balancing loads between neighboring base stations, a mobility robustness optimization (MRO) function of optimizing a handover parameter for minimal radio link failure (RLF) at a handover, and an energy saving (ES) function of minimizing unnecessary base station operation time to save power.

Self-healing functions are functionalities in which a failure of a component occurring during a network operation is recognized and automatically restorable components are restored to solve an error and to minimize impacts of the error on a system. In the self-healing functions, alarms raised in the occurrence of a failure of equipment are monitored, additional relevant information is collected through measurement or inspection when an alarm is raised, and a corresponding recovery operation is performed if automatic recovery is possible. In a case of software failures, for the recovery operation, system initialization, backup software reinstallation, start of failure recovery software, downloading a new software unit, and reconfiguration may be performed. In a case of hardware failures, extra back hardware is operated if available, while operations may be performed with reduced performance or functions if extra hardware is unavailable.

Hereinafter, the MRO function among the self-optimization functions is described.

MRO is an SON operation for automatically optimizing corresponding handover settings based on a report on radio connection failure of a UE and connection reconfiguration information in order to reduce handover failure that occurs in cell configuration for mobility. That is, MRO is intended to automatically optimize influential parameters in an active-mode handover and an idle-mode cell reselection, thereby increasing user sensory quality and performance MRO is generally based on the assumption of a fixed cell area and is at least based on the assumption of an infrequently changing configuration. However, when the area is dynamically changed by an active antenna system (AAS), optimization can be achieved through sufficient time.

A typical handover parameter optimization method performed by a mobile carrier is a method of collecting post-processing a related system log through a test run. Handover ping pong, a handover failure, and an RLF, which may be incurred by wrong handover parameter settings, may cause deterioration in user sensory quality and waste of network resources. Thus, MRO is primarily intended to reduce the number of RLFs related to a handover.

Further, handover parameter settings which are not completely optimized may not cause an RLF but lead to deterioration in service performance. For example, inappropriate handover hysteresis settings cause a handover ping pong phenomenon or an excessive delay time with respect to a target cell. Therefore, an MRO algorithm is secondarily intended to reduce inefficient use of network resources due to unnecessary or wrong handover decisions.

Figure 7:
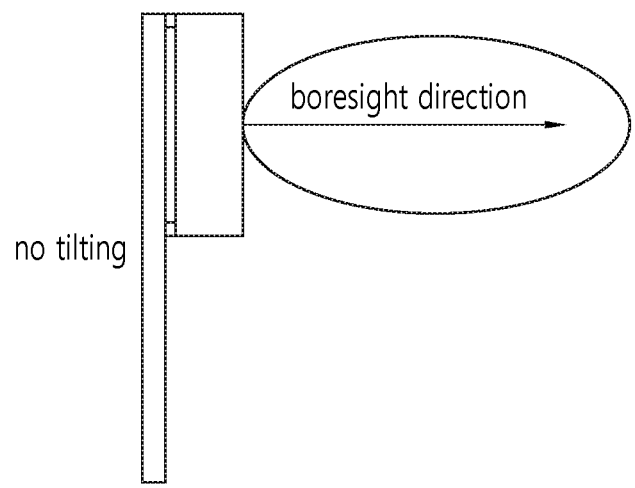
FIGS. 7 to 9 illustrate an antenna tilting method.
Figure 8:
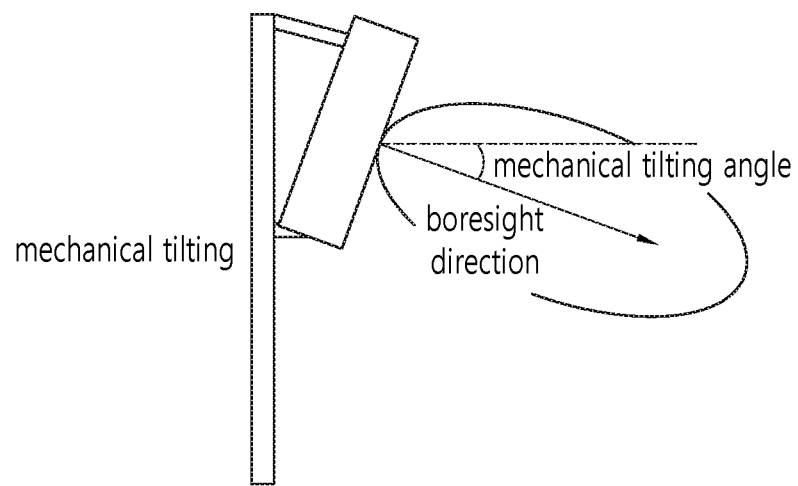
Figure 9:
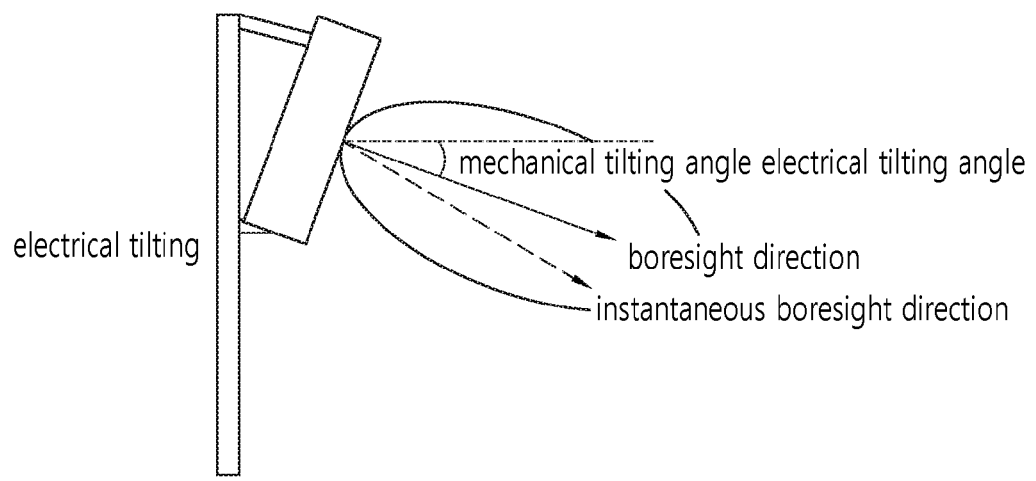

FIGS. 7 to 9 illustrate an antenna tilting method.

FIG. 7 illustrates a case that antenna tilting is not performed, FIG. 8 shows mechanical tilting, and FIG. 9 represents electrical tilting.

A conventional cellular system has adopted a method for reducing, by an eNB, inter-cell interference based on mechanical tilting or electrical tilting and improving a Signal to Interference-plus-Noise Ratio (SINR) of UEs in the cell. However, in the case of mechanical tilting of FIG. 8, there is a disadvantage that the beam direction is fixed in the initial installation and that since a mechanical tilting angle is determined according to the height of a building where the eNB is to be installed and the height of a support, a radiation beam width needs to be wider. In the case of electrical tilting of FIG. 9, it has a downside in that a tilting angle may be changed by using an internal phase shift module, but only very restrictive vertical beamforming is possible due to actually cell-fixed tilting. When an active antenna system (AAS) is employed, free horizontal beamforming and/or vertical beamforming may be implemented, compared with conventional tilting.

Figure 10:
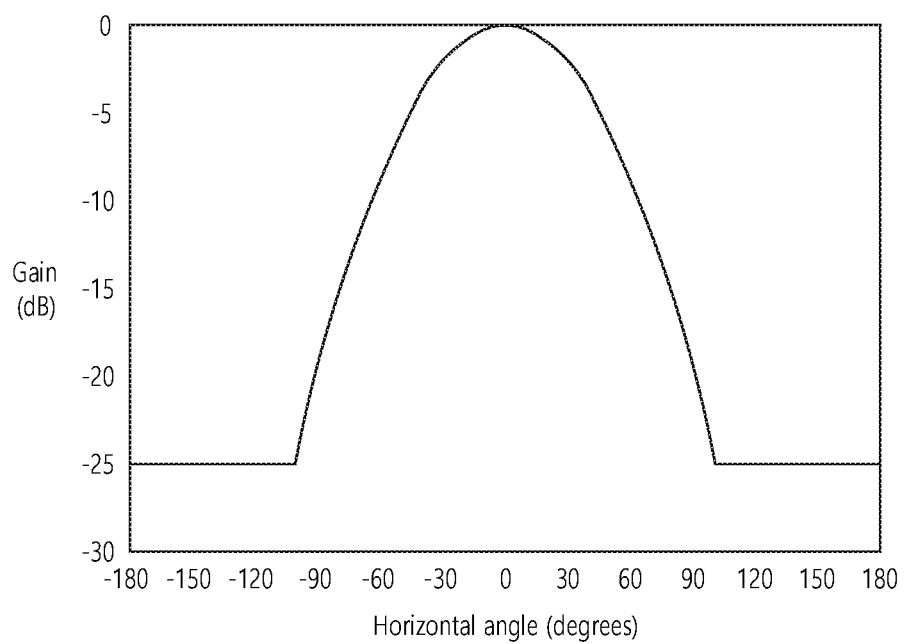
FIGS. 10 and 11 illustrate a pattern of a beam generated by an eNB in the case of considering conventional electrical tilting.
Figure 11:
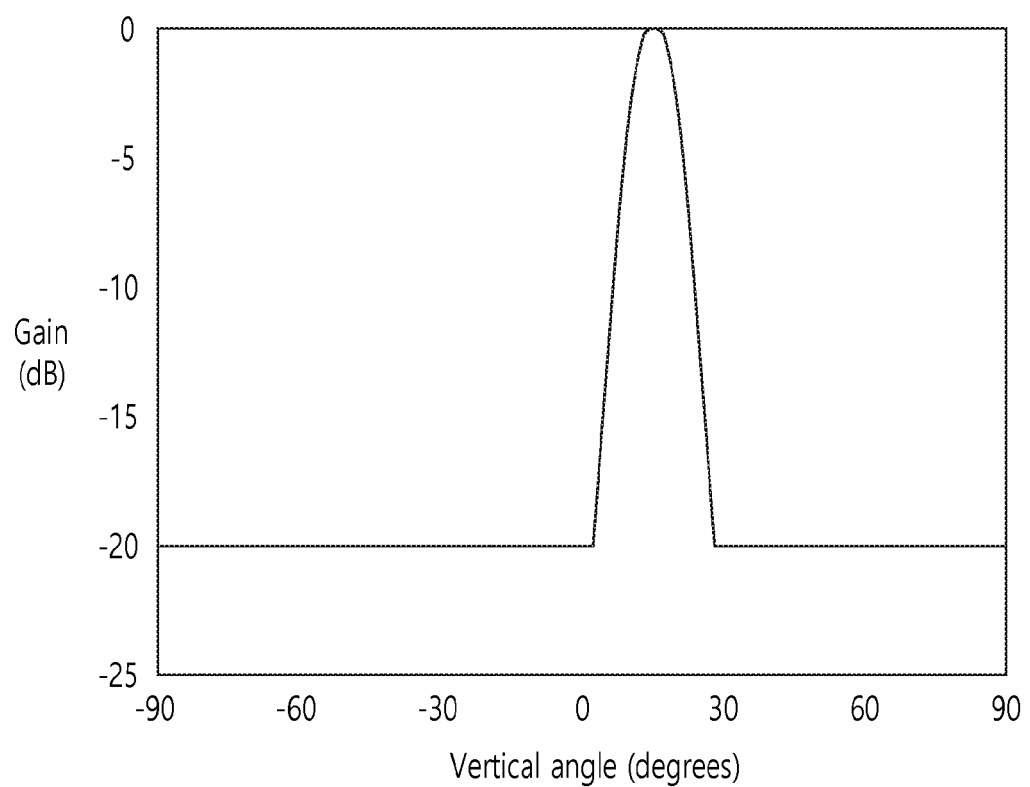

FIG. 10 and FIG. 11 illustrate a pattern of a beam generated by an eNB in the case of considering conventional electrical tilting.

FIG. 10 illustrates a general horizontal beam pattern, and FIG. 11 shows a vertical beam pattern when it is assumed that an electrical tilting angle is 15 degrees.

The beam characteristics of an antenna considered in the 3GPP or generally known may have the following values. The vertical beam width may have an angle of about 10° to about 15° based on a Half Power Beam Width (HPBW) standard, and the horizontal beam width may have an angle of about 65° to about 70° based on the HPBW standard. Here, the HPBW means a beam considering 3 dB gain attenuation. The HPBW may represent a sharpness of the main lobe using physical quantity that indicates a directivity level, as an order angle. A smaller HPBW means that a beam has sharper directivity. Using an active antenna may secure a wider beam width than a pattern of a beam generated by an eNB in the case of using electrical tilting.

Figure 12:
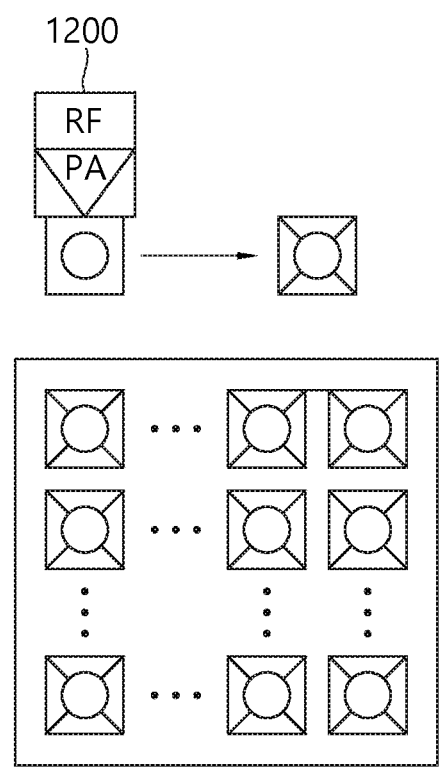
FIG. 12 illustrates an active antenna system (AAS).

FIG. 12 illustrates an active antenna system (AAS).

Referring to FIG. 12, the AAS is realized in the form of coupling a Radio Frequency (RF) module 1200 to each antenna that is a passive device unlike a conventional passive antenna system. The AAS includes the RF module 1200, i.e. an active device, in each antenna, adjusting power and phase of each antenna module. The AAS may improve matters related to antenna performance (e.g., an increase in the effective length of a small antenna, an increase in bandwidth, a reduction in a coupling and noise reduction, between array devices, or improved transmission power efficiency), enables high integration in connection with Microwave Integrated Circuit (MIC) and Monolithic Microwave Integrated Circuit (MMIC) technologies and, in particular, may recover a shortcoming caused by a high loss due to a transmission line, limited source power, a reduction in antenna efficiency, or a lack of a phase shifter with excellent performance when applied to millimeter wave band communication systems. Since each antenna is coupled to the RF module 1200, each antenna can be controlled per port and adjusted in phase and output to suit communication environments and situations.

Figure 13:
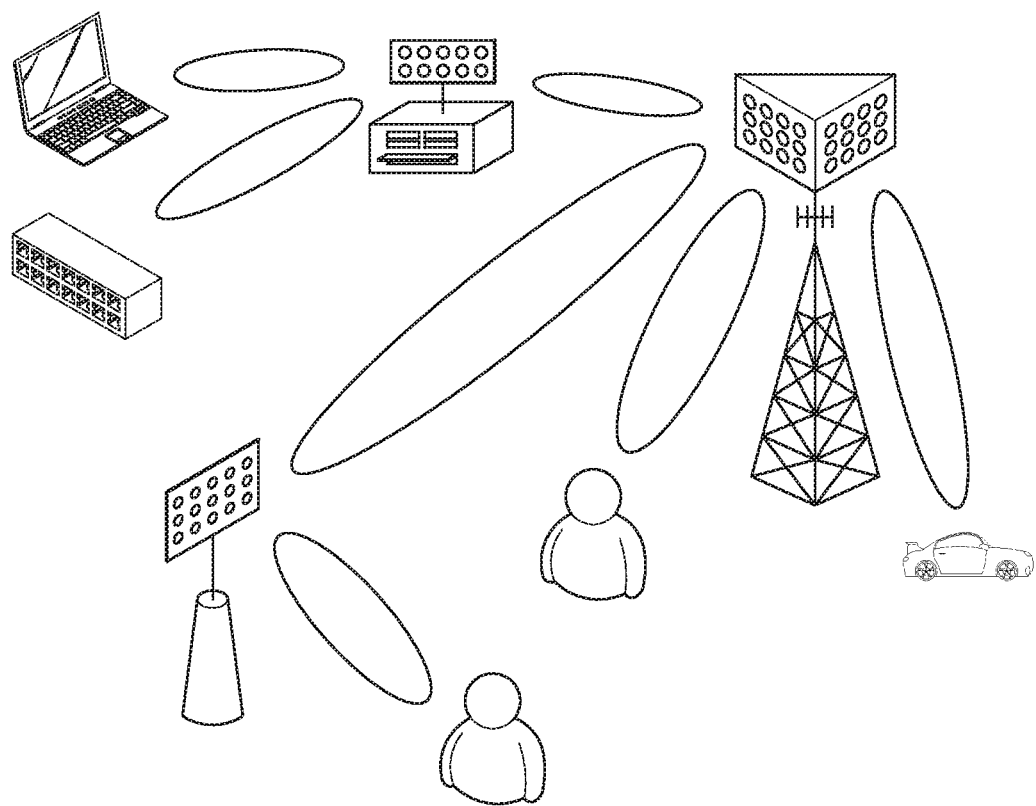
FIG. 13 illustrates a method for transmitting a UE-specific beam based on an active antenna.

FIG. 13 illustrates a method for transmitting a UE-specific beam based on an active antenna.

Referring to FIG. 13, in the case of using an active antenna, the beam direction is adjusted in a corresponding direction with respect to a certain target to control power based on the location of the target, performing beamforming to the target.

Figure 14:
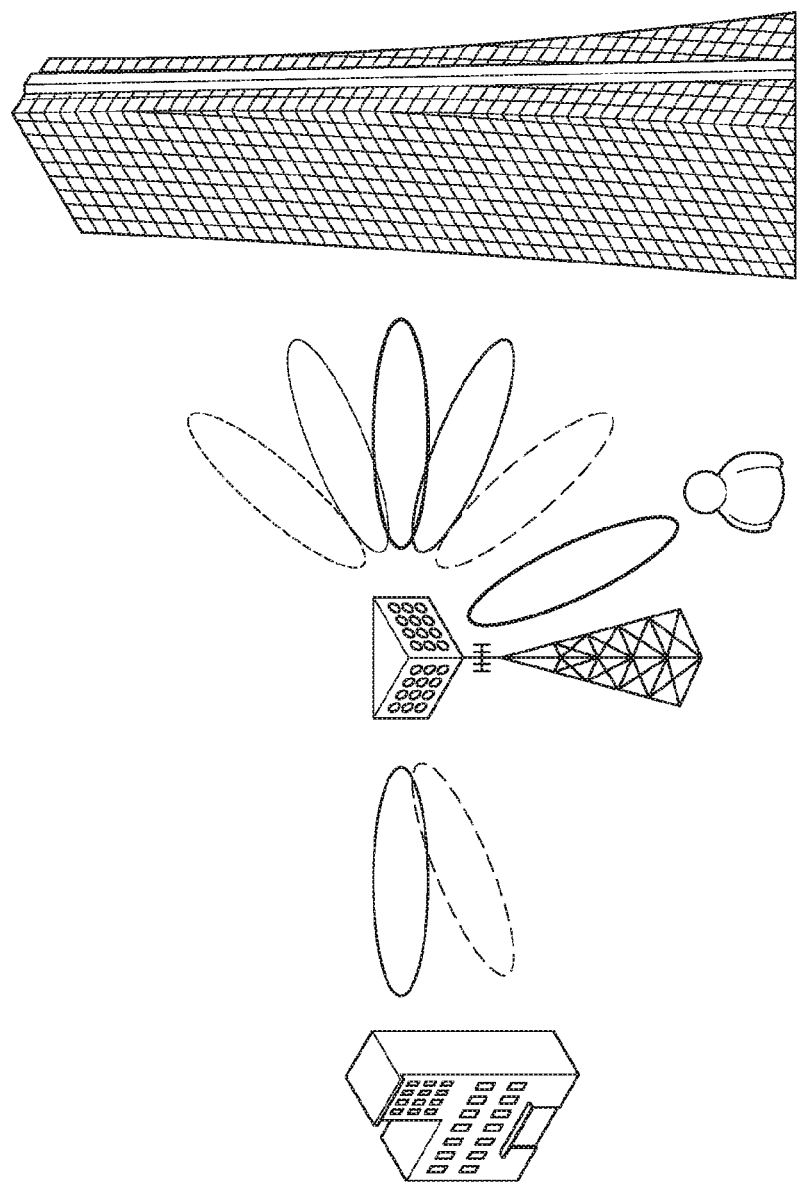
FIG. 14 illustrates a method for transmitting a UE-specific beam based on an active antenna.

FIG. 14 illustrates a method for transmitting a UE-specific beam based on an active antenna.

A transmission environment using the 2D active antenna array might mainly include an Outdoor to Indoor (O2I) environment where an external eNB transmits a signal to an indoor UE and an outdoor urban micro cell environment. Referring to FIG. 14, transmitting a beam using the 2D active antenna array allows an eNB to enable UE-specific horizontal beam steering and vertical beam steering considering various UE heights according to building heights, being used in a real cell environment where a plurality of various buildings exists in a cell. A cell environment where a plurality of buildings with various heights in a cell exists may be taken into consideration. In this case, channel characteristics and the like that are very different from a conventional wireless channel environment may be considered. For example, a beam may be steered in consideration of a change in shade/path loss according to height difference, a change in the fading characteristics including Line of Sight (LoS)/Non-Line of Sight (NLoS), and Direction of Arrival (DoA), etc.

AAS technology generally includes beamforming, cell shaping, and cell splitting techniques.

In beamforming, radio resource management (RRM) is performed by changing a beam within a short time without changing a cell area. Thus, the entire cell area uses the same PCI and beam control is performed autonomously by a base station. It is considered that additional improvement in an SON shape is not needed.

In cell splitting, a cell sector may be split horizontally or vertically, may be dynamically split by time, and may be split several times for from one hour to several days. Cell splitting is configured by operations, administration, and maintenance (OAM) and may cause impact on MRO in connection with the existing SON operation. In a cell splitting scenario, an area designated in advance by OAM, not by a base station, is split according to network loads or a user service demand. An RAN may send MDT measurement data or statistical data for OAM optimization. Cells may be repeatedly split and merged, which depends on a network condition. Cell splitting is performed considering both scenarios of using the same frequency and using different scenarios.

In cell shaping, a cell area is changed using an AAS over an hour or a longer time. The entire cell area uses the same PCI, and the change of the cell is controlled by OAM, in which MRO problems may occur depending on a cell change level.

Hereinafter, cell shaping according to the present invention is described.

An optimal AAS configuration depends on various factors, particularly not only traffic loads and a traffic distribution but also a change in the interference conditions due to a change in the applied deployment change. Since an AAS is likely to be triggered regionally by an eNB, the node may need to use all necessary information in order to optimally use AAS functions. For example, an AAS mechanism may be used to increase capacity. The AAS mechanism is triggered in an overload situation. However, load information alone is not reliable as a decision criterion, but traffic distribution is also needed as proved in FIGS. 15 and 16. Hereinafter, FIGS. 15 to 17 are described in detail.

Figure 15:
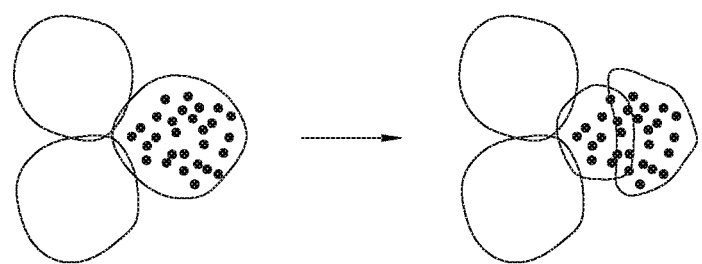
FIG. 15 illustrates a user traffic distribution in which cell splitting is useful.
Figure 16:
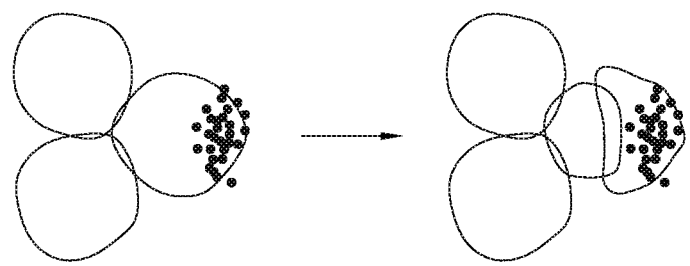
FIG. 16 illustrates a user traffic distribution in which cell splitting is not useful.
Figure 17:
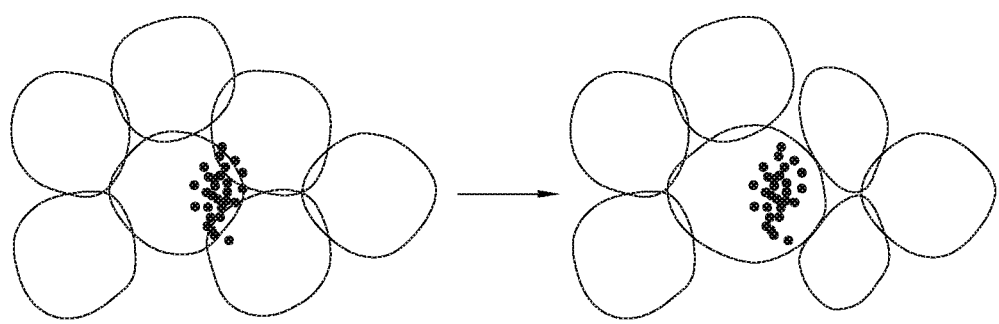
FIG. 17 illustrates a user traffic distribution in which cell shaping is more useful than cell splitting.

FIG. 15 illustrates a user traffic distribution in which cell splitting is useful, FIG. 16 illustrates a user traffic distribution in which cell splitting is not useful, and FIG. 17 illustrates a user traffic distribution in which cell shaping is more useful than cell splitting.

Since FIGS. 15 to 17 include the same number of dots, cell loads are the same in FIGS. 15 to 17. However, traffic distributions are different in that loads are evenly distributed throughout the cell in FIG. 15, while loads are concentrated in a portion of the cell in FIGS. 16 and 17. Since traffic may be shared between new cells in FIG. 15, cell splitting is useful in the embodiment of FIG. 15. However, in the embodiment of FIG. 16, when cell splitting is performed, an internal (left) sector is never used, and thus cell splitting is not useful. Thus, in the environment illustrated in FIG. 16, cell shaping is more useful than cell splitting. In FIG. 17, an eNB may completely cover a traffic hot spot by applying cell shaping. Thus, cell shaping is useful rather than cell splitting in the embodiments of FIGS. 16 and 17. Here, cell shaping affects a neighboring cell and thus may need traffic situation information on the neighboring cell.

To support cell shaping proposed in FIG. 17, an eNB that desires cell shaping may receive a spatial traffic distribution from each neighboring eNB influential in determining whether to perform cell shaping. Unlike the foregoing proposed method, the eNB that desires cell shaping may start cell shaping by providing information on the eNB to neighboring cells. Hereinafter, embodiments of the present invention are described in detail.

Figure 18:
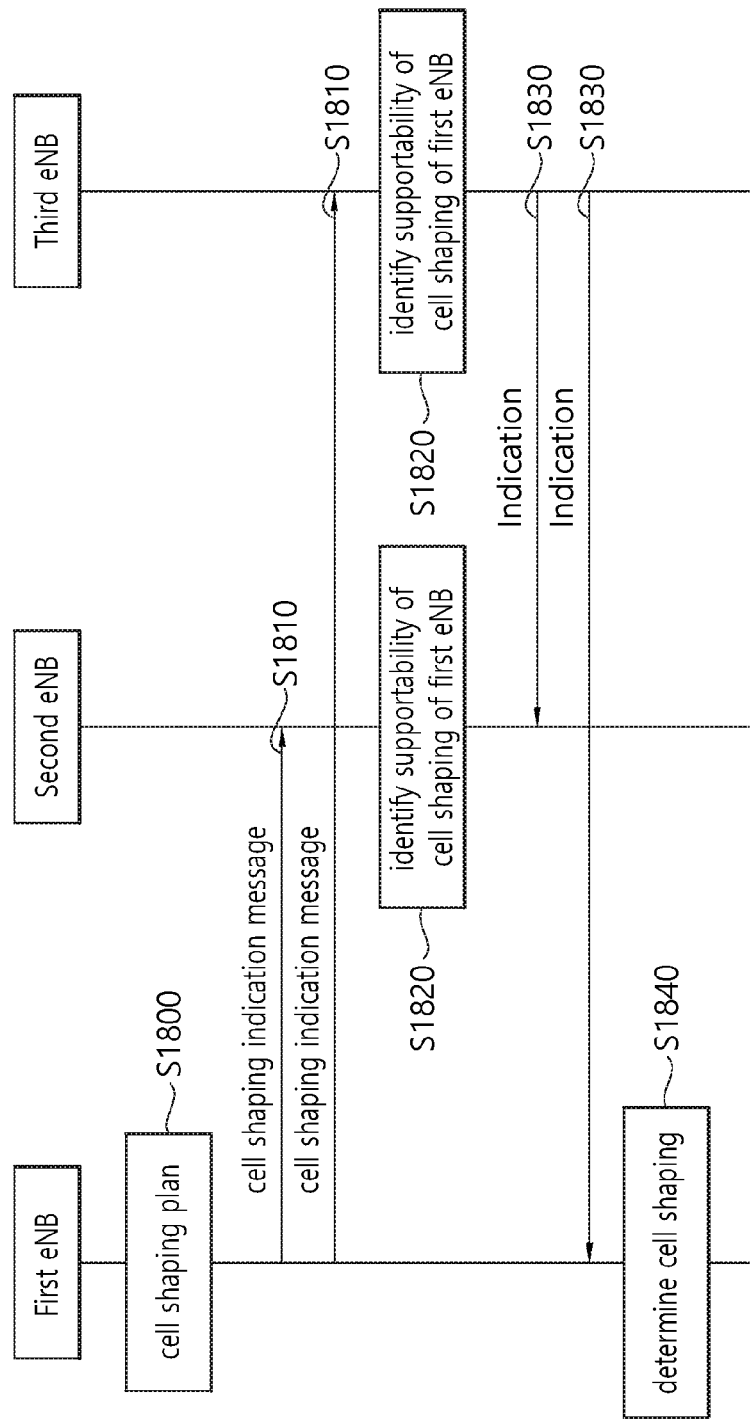
FIG. 18 illustrates a cell shaping procedure of an eNB according to an embodiment of the present invention.

FIG. 18 illustrates a cell shaping procedure of an eNB according to an embodiment of the present invention.

Referring to FIG. 18, an eNB to perform cell shaping indicates a cell shaping plan to a neighboring eNB having an X2 connection with the eNB, and the neighboring eNB notifies the eNB whether the neighboring cell is capable of supporting cell shaping in the current conditions based on the indication. Hereinafter, each operation is described in detail.

A first eNB may plan cell shaping based on a current state (for example, cell loads and a spatial traffic distribution) (S1800).

The first eNB may notify a second eNB and a third eNB that the first eNB desires cell shaping using a cell shaping indication message (or an existing message or a new information element (IE) included in a new or existing message). If there are different types of cell shaping and the first eNB selects one type of cell shaping, the cell shaping indication message (or existing message) may include a new IE indicating the selected type. It may be assumed that a set of parameters for each type to be changed in advance by OAM in the activation of cell shaping is predefined between neighboring eNBs (S1810).

When the message is received from the first eNB, the second eNB and the third eNB may identify whether the second eNB and the third eNB are capable of supporting the cell shaping of the first eNB in view of current conditions thereof. If the message received from the first eNB includes the selected type, the second eNB and the third eNB may identify whether the second eNB and the third eNB are capable of applying a corresponding predefined set of parameters. Further, the second eNB and the third eNB may identify whether there is a supportable type among the other types than one type indicated by the first eNB in view of current conditions thereof (S1820).

According to a result in S1820, the second eNB and the third eNB may notify the first eNB whether cell shaping of the first eNB is possible using the indication message (or the existing message or new IE included in the new or existing message). This message may include the supportable type selected in S1820 (S1830).

When both the second eNB and the third eNB indicate that cell shaping of the first eNB is possible, the first eNB may indicate cell shaping to the second eNB and the third eNB and may perform cell shaping. Otherwise, the first eNB may determine not to perform cell shaping, or may identify whether a different type of cell shaping is possible if the indication message includes a supportable type (S1840).

Figure 19:
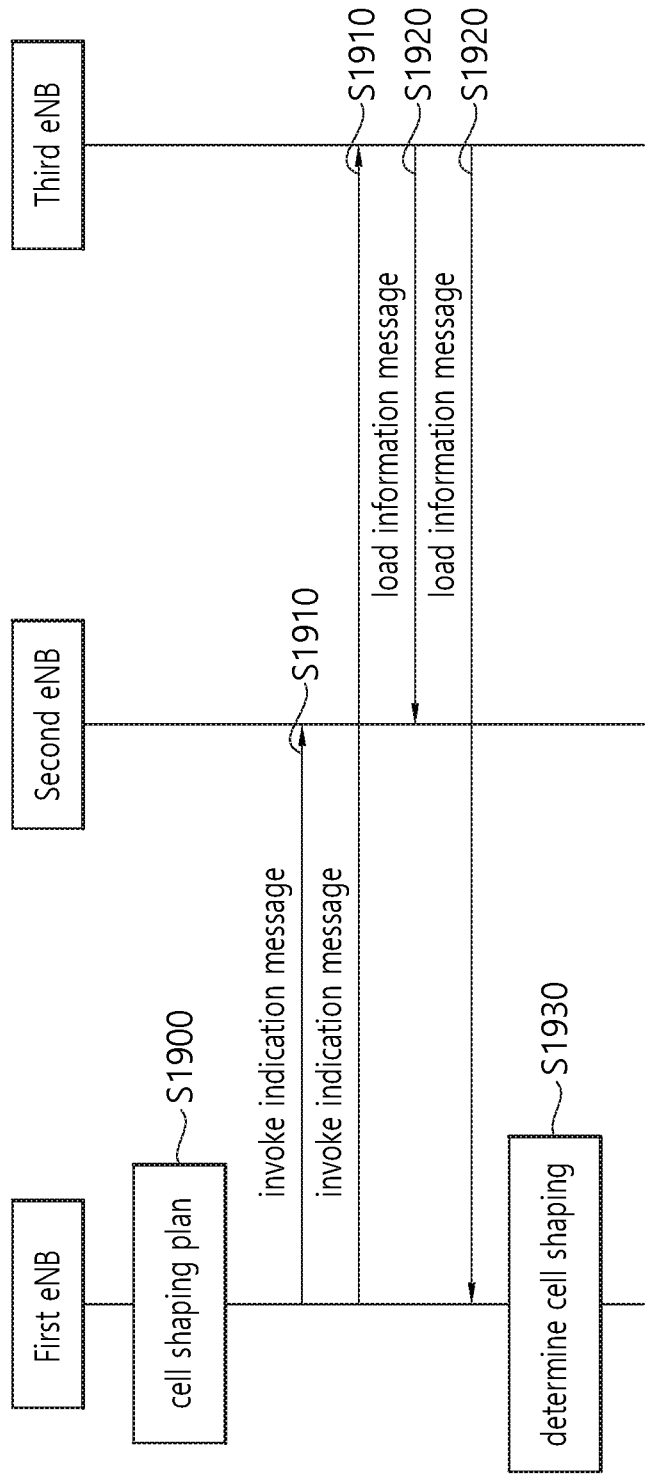
FIG. 19 illustrates a cell shaping procedure of an eNB according to an embodiment of the present invention.

FIG. 19 illustrates a cell shaping procedure of an eNB according to an embodiment of the present invention.

Referring to FIG. 19, an eNB to perform cell shaping may request a spatial traffic distribution from neighboring eNBs before determining cell shaping. An invoke indication through an X2 interface may be used to request the spatial traffic distribution. Hereinafter, each operation is described in detail.

A first eNB may plan cell shaping based on a current state (for example, cell loads and a spatial traffic distribution) (S1900).

The first eNB may transmit an invoke indication message (or an existing message or a new IE included in a new or existing message) to a second eNB and a third eNB in order to request spatial traffic distributions of the second eNB and the third eNB (S1910).

When the message is received from the first eNB, the second eNB and the third eNB may transmit load information messages including the spatial traffic distributions thereof (S1920).

When the messages are received from the respective eNBs, the first eNB may determine whether the first eNB is allowed to perform a cell shaping operation based on the received information. When cell shaping is possible, the first eNB may indicate a decision to perform cell shaping to the second eNB and the third eNB and may perform cell shaping. Otherwise, the first eNB may determine not to perform cell shaping (S1930).

Figure 20:
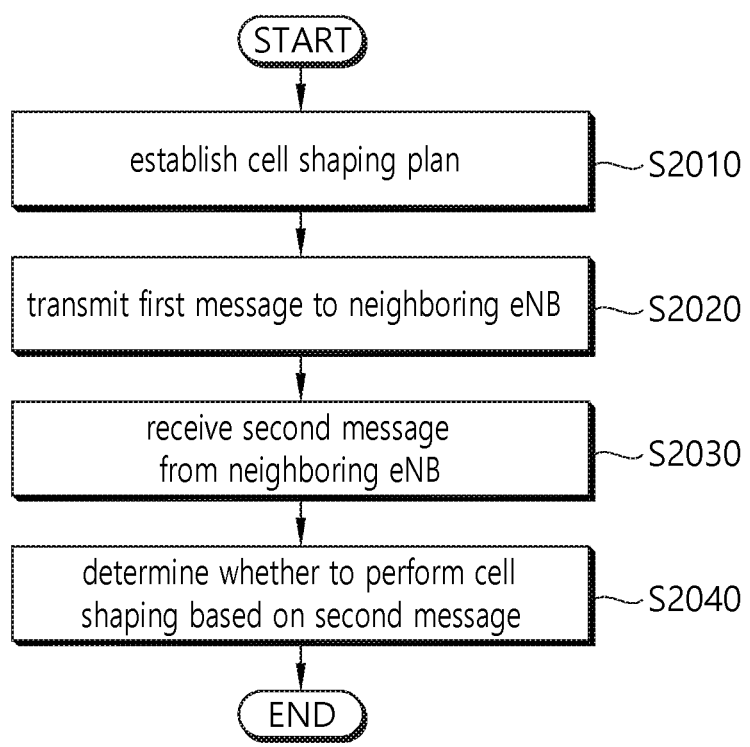
FIG. 20 is a block diagram illustrating a cell shaping procedure of an eNB according to an embodiment of the present invention

FIG. 20 is a block diagram illustrating a cell shaping procedure of an eNB according to an embodiment of the present invention.

Referring to FIG. 20, an eNB may establish a cell shaping plan (S2010). The cell shaping plan may be established based on a current state of the eNB, and the current state of the eNB may be loads and a spatial traffic distribution of the eNB.

The eNB may transmit a first message to a neighboring eNB (S2020), and may receive a second message from the neighboring eNB (S2030). The first message may include the cell shaping plan, and the second message may include information on whether the neighboring eNB is capable of performing cell shaping. The first message may include any one in a parameter set predefined for cell shaping, and the second message may include information on the applicability of the one in the predefined parameter set included in the first message and on the applicability of other parameters. The first message may include a request to report a spatial traffic distribution of the neighboring eNB, and the second message may include the spatial traffic distribution of the neighboring eNB.

The eNB may determine whether to perform cell shaping based on the second message (S2040). When it is possible to perform cell shaping based on the second message, the eNB may indicate cell shaping to the neighboring eNB and may perform cell shaping. When it is impossible to perform cell shaping based on the second message, the eNB may not perform cell shaping. When it is possible to apply the one in the predefined parameter set based on the second message, the eNB may indicate cell shaping to the neighboring eNB and may perform cell shaping by applying the one in the predefined parameter set. When it is impossible to apply the one in the predefined parameter set based on the second message, the eNB may not perform cell shaping or may identify whether it is possible to perform a different type of cell shaping by applying an applicable type in the predefined parameter set.

Figure 21:
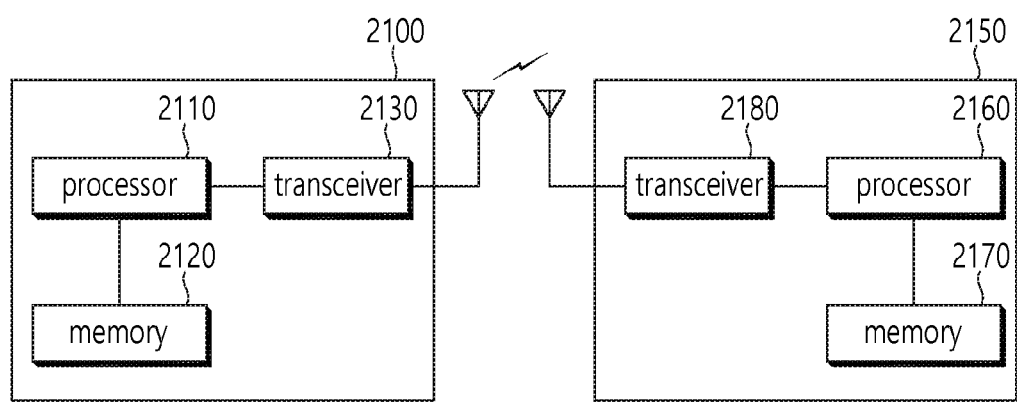
FIG. 21 is a block diagram illustrating a wireless communication system according to an embodiment of the present invention.

FIG. 21 is a block diagram illustrating a wireless communication system according to the embodiment of the present invention.

An eNB 2100 includes a processor 2110, a memory 2120 and a transceiver 2130. The memory 2120 is connected to the processor 2110, and stores various types of information for driving the processor 2110. The transceiver 2130 is connected to the processor 2110, and transmits and/or receives radio signals. The processor 2110 implements proposed functions, processes and/or methods. In the above embodiment, an operation of the base station may be implemented by the processor 2110.

A UE 2150 includes a processor 2160, a memory 2170 and a transceiver 2180. The memory 2170 is connected to the processor 2160, and stores various types of information for driving the processor 2160. The transceiver 2180 is connected to the processor 2160, and transmits and/or receives radio signals. The processor 2160 implements proposed functions, processes and/or methods. In the above embodiment, an operation of the base station may be implemented by the processor 2160.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Methods to be realized according to features of the foregoing present invention in the above illustrated system have been described by referring to flowcharts. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

What is claimed is:

1. A method, by an eNodeB (eNB), for performing cell shaping in a wireless communication system, the method comprising:
    planning the cell shaping of the eNB, based on a current state of the eNB;
    transmitting a first message indicating the planned cell shaping of the eNB, to a neighboring eNB;
    receiving a second message indicating whether or not the neighboring eNB supports the planned cell shaping of the eNB, from the neighboring eNB, in response to the first message; and
    determining whether to perform the planned cell shaping based on the second message,
    wherein the eNB determination is to perform the planned cell shaping when the second message indicates that the neighboring eNB supports the planned cell shaping of the eNB, and
    wherein the eNB determination is to not perform the planned cell shaping when the second message indicates that the neighboring eNB does not support the planned cell shaping of the eNB.

2. The method of claim 1, wherein the current state of the eNB comprises loads of the eNB and spatial traffic distribution of the eNB.

3. The method of claim 1, wherein the eNB and the neighboring eNB are connected via X2.

4. The method of claim 1, wherein the first message is one of a cell shaping indication message, an existing message, a new information element (IE) comprised in an existing message, and a new IE comprised in a new message, and
    wherein the second message is one of an indication message, an existing message, a new IE comprised in an existing message, and a new IE comprised in a new message.

5. The method of claim 1, further comprising:
    transmitting a determination of the cell shaping, to the neighboring eNB, when the second message indicates that the neighboring eNB supports the planned cell shaping of the eNB.

6. The method of claim 1, wherein the first message includes a first parameter for the planned cell shaping, and
    wherein the second message includes information on applicability of the first parameter included in the first message, and applicability of other parameters in a set of predefined parameters.

7. The method of claim 6, further comprising:
    checking whether or not to perform a different type of cell shaping, by applying other parameters in the set of predefined parameters, when the second message indicates that the neighboring eNB does not support the planned cell shaping of the eNB.

8. The method of claim 1, wherein the first message includes a request to report spatial traffic distribution of the neighboring eNB, and
    wherein the second message includes the spatial traffic distribution of the neighboring eNB.

9. The method of claim 8, wherein the first message is one of an invoke indication message, an existing message, a new IE comprised in an existing message, and a new IE comprised in a new message, and
    wherein the second message is a load information message.

10. An eNodeB (eNB) for performing cell shaping, the eNB comprising:
    a memory;
    a transceiver; and
    a processor to connect the memory and the transceiver,
    wherein the processor is configured to:
        plan the cell shaping of the eNB, based on a current state of the eNB;
        control the transceiver to transmit a first message indicating the planned cell shaping of the eNB, to a neighboring eNB;
        control the transceiver to receive a second message indicating whether or not the neighboring eNB supports the planned cell shaping of the eNB, from the neighboring eNB, in response to the first message; and
        determine whether to perform the planned cell shaping based on the second message,
        wherein the eNB determination is to perform the planned cell shaping when the second message indicates that the neighboring eNB supports the planned cell shaping of the eNB, and
        wherein the eNB determination is to not perform the planned cell shaping when the second message indicates that the neighboring eNB does not support the planned cell shaping of the eNB.

11. The eNB of claim 10, wherein the processor is configured to:
    control the transceiver to transmit a determination of the cell shaping, to the neighboring eNB, when the second message indicates that the neighboring eNB supports the planned cell shaping of the eNB.

12. The eNB of claim 10, wherein the first message includes a first parameter for the planned cell shaping, and
    wherein the second message includes information on applicability of the first parameter included in the first message, and applicability of other parameters in a set of predefined parameters.

13. The eNB of claim 12, wherein the processor is configured to:
    check whether or not to perform a different type of cell shaping, by applying other parameters in the set of predefined parameters, when the second message indicates that the neighboring eNB does not support the planned cell shaping of the eNB.

* * * * *